United States Patent
Uchino et al.

(10) Patent No.: US 9,668,174 B2
(45) Date of Patent: May 30, 2017

(54) MOBILE COMMUNICATION METHOD

(71) Applicant: NTT DOCOMO, INC., Tokyo (JP)

(72) Inventors: Tooru Uchino, Tokyo (JP); Hideaki Takahashi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 9 days.

(21) Appl. No.: 14/773,827

(22) PCT Filed: Mar. 14, 2014

(86) PCT No.: PCT/JP2014/056908
§ 371 (c)(1),
(2) Date: Sep. 9, 2015

(87) PCT Pub. No.: WO2014/156727
PCT Pub. Date: Oct. 2, 2014

(65) Prior Publication Data
US 2016/0029252 A1   Jan. 28, 2016

(30) Foreign Application Priority Data

Mar. 25, 2013  (JP) .................................. 2013-062706

(51) Int. Cl.
*H04W 4/00*   (2009.01)
*H04W 36/00*  (2009.01)
(Continued)

(52) U.S. Cl.
CPC ... *H04W 36/0005* (2013.01); *H04W 72/0426* (2013.01); *H04W 72/0453* (2013.01);
(Continued)

(58) Field of Classification Search
CPC ......... H04W 36/0005; H04W 72/0426; H04W 72/0453; H04W 74/08; H04W 76/021;
(Continued)

(56) References Cited

U.S. PATENT DOCUMENTS 8,446,844 B1 * 5/2013 Dinan ............... H04W 36/0072
370/252
2012/0046066 A1 * 2/2012 Tamura .................. H04L 1/0029
455/525

(Continued)

FOREIGN PATENT DOCUMENTS

| CA | 2 886 958 A1 | 4/2014 |
| WO | 2014/054201 A1 | 4/2014 |

OTHER PUBLICATIONS

International Search Report issued in corresponding application No. PCT/JP2014/056908 mailed May 20, 2014 (2 pages).
(Continued)

*Primary Examiner* — Kevin Mew
(74) *Attorney, Agent, or Firm* — Osha Liang LLP

(57) ABSTRACT

A procedure for starting "Inter-site CA" is performed while minimizing modification of an existing network configuration. A mobile communication method of the invention includes the steps of: causing a radio base station eNB #1 to send a radio base station eNB #11 "CA preparation;" causing the radio base station eNB #11 to send the radio base station eNB #1 "confirmation;" causing the radio base station eNB #1 to send a mobile station UE "RRC connection reconfiguration;" causing the mobile station UE to send the radio base station eNB #11 "RRC connection reconfiguration complete;" and causing the radio base station eNB #11 to send the radio base station eNB #1 "CA addition complete."

12 Claims, 6 Drawing Sheets

(51) Int. Cl.
*H04W 72/04* (2009.01)
*H04W 76/02* (2009.01)
*H04W 16/32* (2009.01)
*H04W 92/20* (2009.01)
*H04W 74/08* (2009.01)
*H04W 88/02* (2009.01)
*H04W 88/08* (2009.01)

(52) U.S. Cl.
CPC .......... *H04W 76/021* (2013.01); *H04W 16/32* (2013.01); *H04W 36/0055* (2013.01); *H04W 74/08* (2013.01); *H04W 88/02* (2013.01); *H04W 88/08* (2013.01); *H04W 92/20* (2013.01)

(58) Field of Classification Search
CPC ..... H04W 88/02; H04W 88/08; H04W 92/20; H04W 16/32
See application file for complete search history.

(56) References Cited

U.S. PATENT DOCUMENTS

| | | | |
|---|---|---|---|
| 2012/0170570 A1* | 7/2012 | Chang | H04W 56/005 370/350 |
| 2012/0178456 A1* | 7/2012 | Peisa | H04W 8/245 455/436 |
| 2012/0327821 A1* | 12/2012 | Lin | H04W 72/048 370/280 |
| 2013/0156008 A1* | 6/2013 | Dinan | H04B 7/0456 370/332 |
| 2013/0343345 A1* | 12/2013 | Dinan | H04W 36/30 370/332 |
| 2014/0301360 A1* | 10/2014 | Bontu | H04W 36/0083 370/331 |
| 2015/0124748 A1* | 5/2015 | Park | H04L 5/0032 370/329 |
| 2015/0181473 A1* | 6/2015 | Horn | H04W 36/0027 370/331 |
| 2015/0215965 A1* | 7/2015 | Yamada | H04W 76/046 370/329 |
| 2015/0304891 A1* | 10/2015 | Dinan | H04W 72/0413 370/331 |
| 2015/0358866 A1* | 12/2015 | Xu | H04W 36/00 370/331 |
| 2015/0373586 A1* | 12/2015 | Uchino | H04W 76/025 370/329 |
| 2015/0373684 A1* | 12/2015 | Uchino | H04W 72/0406 370/330 |
| 2016/0165627 A1* | 6/2016 | Uemura | H04W 76/046 370/336 |
| 2016/0219475 A1* | 7/2016 | Kim | H04W 76/025 |
| 2016/0219604 A1* | 7/2016 | Fujishiro | H04W 72/085 |
| 2016/0285716 A1* | 9/2016 | Pelletier | H04L 5/0098 |

OTHER PUBLICATIONS

Written Opinion issued in corresponding application No. PCT/JP2014/056908 mailed May 20, 2014 (5 pages).

Nokia Siemens Networks; "Carrier Based ICIC for inter-eNB PCell/SCell Optimization"; 3GPP TSG-RAN WG3 Meeting #75-Bis, R3-120602, San Jose del Cabo, Mexico; Mar. 26-30, 2012 (4 pages).

Etri; "Evaluation assumptions for inter-site CA"; 3GPP TSG RAN WG1 Meeting #72, R1-130175, St. Julian's, Malta; Jan. 28-Feb. 1, 2013 (3 pages).

NTT Docomo, Inc.; "Discussion on U-plane architecture for dual connectivity"; 3GPP TSG-RAN WG2 #81, Tdoc R2-130324, St. Julian's, Malta; Jan. 28-Feb. 1, 2013 (6 pages).

Sharp; "Initial setup procedure for dual connectivity"; 3GPP TSG-RAN WG2#83, R2-132750, Barcelona, Spain; Aug. 19-23, 2013 (3 pages).

3GPP TS 36.300 V11.5.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Mar. 2013 (209 pages).

* cited by examiner

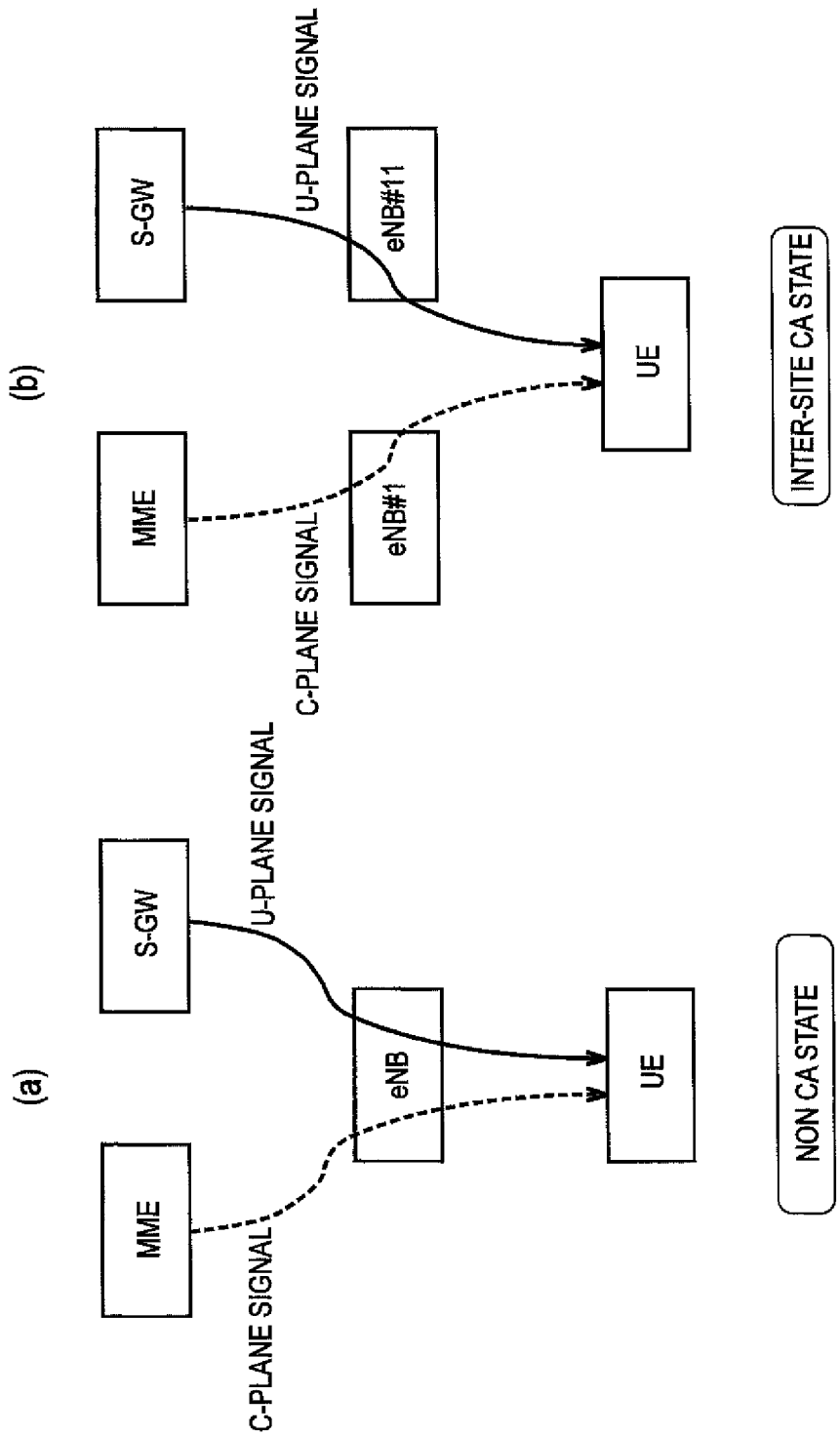

US 9,668,174 B2

MOBILE COMMUNICATION METHOD

TECHNICAL FIELD

The present invention relates to a mobile communication method.

BACKGROUND ART

In LTE (Long Term Evolution), handover control is performed in order for a mobile station UE in "RRC_Connected state" to perform communication constantly by using the most suitable cell (see Non-patent Document 1, for example).

In the handover control, when the mobile station UE performs measurement control to detect a cell having better quality than that of a current cell, the mobile station UE reports this event to a radio access network. The radio access network sends the mobile station UE "HO command" for transitioning to the detected cell. Then, the mobile station UE which received the "HO command" attempts to establish connection to the cell designated as a transition target. FIG. 4 shows a sequence of the above-described handover control.

Meanwhile, In LTE Release-10, CA (carrier aggregation) to perform communication by aggregating multiple CCs (component carriers) under the same radio base station eNB, namely, "Intra-eNB CA" has been introduced in order to realize broadband communication over 20 MHz (for example, communication at 100 MHz) (see FIG. 5(a)).

Thereafter, in LTE Release-12 and beyond, "Small Cell enhancement" has been proposed and introduction of "Inter-site CA (Inter-eNB CA)" to perform communication by aggregating CCs (cells) under different radio base stations eNB is under study as one type of architecture more flexible than the conventional one.

For example, one possible operation by using the "Inter-site CA" is to perform communication of a control signal (a C-plane signal) requiring reliability with a cell #1 (a macrocell) under a radio base station eNB #1 via an SRB (Signaling Radio Bearer), while to perform communication of a user data signal (a U-plane signal) requiring broadband communication with a cell #11 (a small cell) under a radio base station eNB #11 via a DRB (Data Radio Bearer) (see FIG. 5(b)).

FIG. 6(a) shows signal paths of a C-plane signal and a U-plane signal where a mobile station UE is not performing the CA, and FIG. 6(b) shows signal paths of a C-plane signal and a U-plane signal where the mobile station UE is performing the "Inter-site CA" (an operation mode shown in FIG. 5(b)).

PRIOR ART DOCUMENT

Non-Patent Document

Non-patent document 1: 3GPP TS36.300

SUMMARY OF THE INVENTION

However, there is a problem that a procedure for starting the "Inter-site CA" has not been specified in the existing LTE specifications.

The present invention has been made in view of the aforementioned problem. An object of the present invention is to provide a mobile communication method which is capable of performing a procedure for starting the "Inter-site CA" while minimizing modification of an existing network configuration.

A first feature of the present invention is summarized as a mobile communication method including: a step A of causing a first radio base station to send a second radio base station a carrier aggregation preparation signal when the first radio base station determines to start carrier aggregation for a mobile station, where the carrier aggregation uses the first radio base station and the second radio base station; a step B of causing the second radio base station to send the first radio base station a confirmation signal in response to the carrier aggregation preparation signal; a step C of causing the first radio base station to send the mobile station a connection reconfiguration signal in response to the confirmation signal; a step D of causing the mobile station to perform a random access procedure with the second radio base station in response to the connection reconfiguration signal; a step E of causing the mobile station to send the second radio base station a connection reconfiguration completion signal when the random access procedure is completed; a step F of causing the second radio base station to send a core network device a path switch request signal; a step G of causing the core network device to send the second radio base station a path switch completion signal; and a step H of causing the second radio base station to send the first radio base station a carrier aggregation procedure completion signal indicating completion of a procedure for starting the carrier aggregation.

BRIEF DESCRIPTION OF THE DRAWINGS

FIG. 6 is a diagram for explaining the related art.

MODE FOR CARRYING OUT THE INVENTION (Mobile Communication System According to First Embodiment of Present Invention)

A mobile communication system according to a first embodiment of the present invention will be described with reference to FIG. 1 and FIG. 2.

Figure 1:
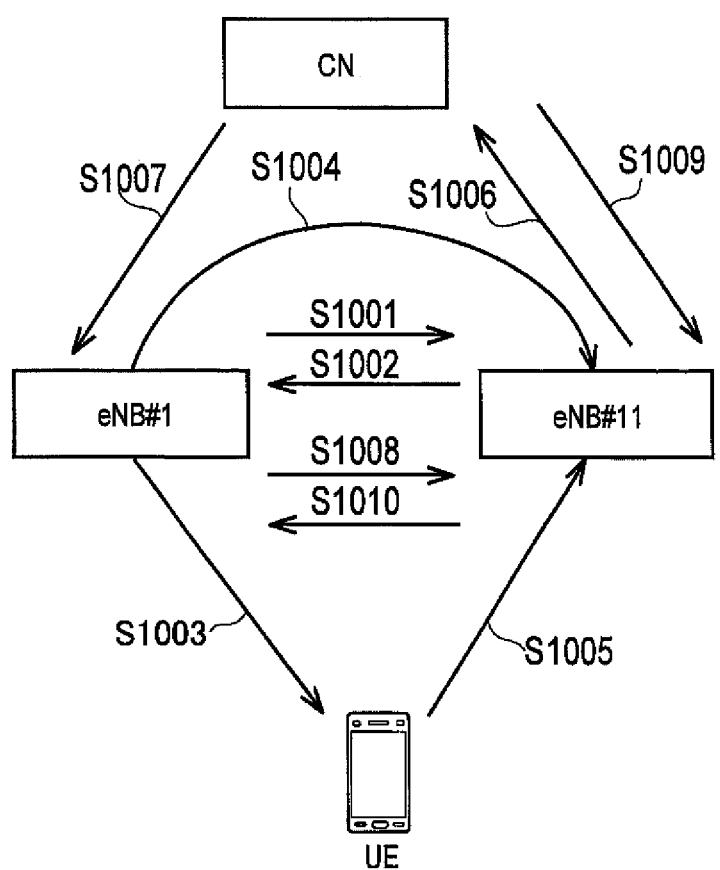
FIG. 1 is an overall configuration diagram of a mobile communication system according to a first embodiment of the present invention.

As shown in FIG. 1, the mobile communication system according to the embodiment includes: a core network device CN such as a mobile management node MME and a gateway device P-GW/S-GW; a radio base station eNB #1 which manages a cell #1; and a radio base station eNB #11 which manages a cell #11.

Here, the cell #11 is a small cell (a phantom cell) and the cell #1 is a macrocell. Note that a coverage area of the cell #11 and a coverage area of the cell #1 are deployed in a manner that the coverage areas at least partially overlap each other.

The radio base station eNB #1 may also be referred to as a macro radio base station (Macro-eNB), while the radio base station eNB #11 may also be referred to as a small radio base station (Small-eNB) or a phantom radio base station (Phantom-eNB).

Meanwhile, the mobile communication system according to the embodiment is an LTE-based mobile communication system. In the mobile communication system according to the embodiment, a mobile station UE is configured to be capable of performing the "Inter-site CA."

Here, a description will be given of a case where the mobile station UE in the mobile communication system according to the embodiment starts the "Inter-site CA" through the cell #1 under the radio base station eNB #1 and the cell #11 under the radio base station eNB #11, from a state of not performing the CA.

An operation of the mobile communication system according to the embodiment will be described below with reference to FIG. 1 and FIG. 2.

Specifically, a description will be given of an operation in the case where the mobile station UE starts the "Inter-site CA" through the cell #1 under the radio base station eNB #1 and the cell #11 under the radio base station eNB #11, from a state of performing communication with the cell #1 under the radio base station eNB #1 (the state of not performing the CA).

Figure 2:
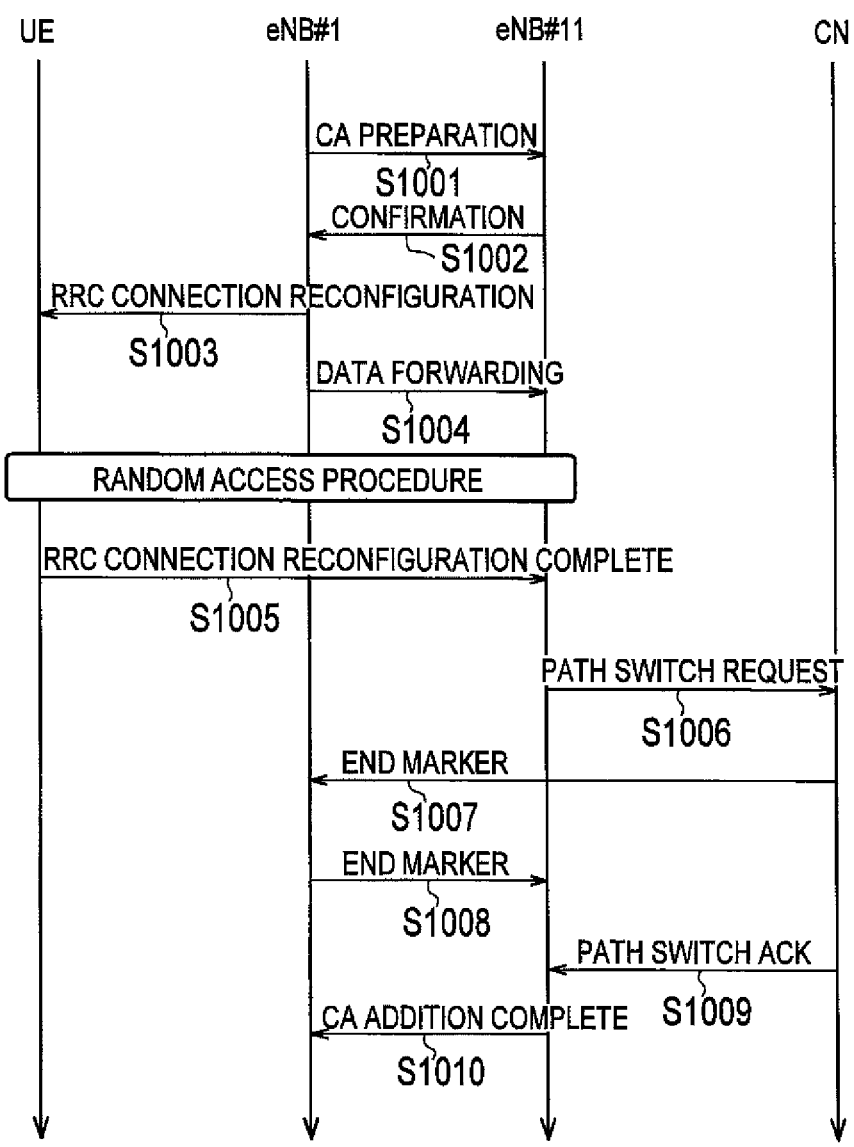
FIG. 2 is a sequence diagram for explaining an operation of the mobile communication system according to the first embodiment of the present invention.

As shown in FIG. 1 and FIG. 2, when the radio base station eNB #1 determines to start the "Inter-site CA" by adding the cell #11 under the radio base station eNB #11 as a cell (an Scell) with which the mobile station UE communicate, the radio base station eNB #1 sends the radio base station eNB #11 "CA preparation" in step S1001.

The "CA preparation" may notify of information on a bearer to be set in the radio base station eNB #11 (such as an identifier of a bearer, setting information on a PDCP layer, setting information on an RLC layer, setting information on an MAC layer, and setting information on a physical layer).

In step S1002, the radio base station eNB #11 sends the radio base station eNB #1 "confirmation" in response to the "CA preparation."

Here, by using the "confirmation," the radio base station eNB #11 may notify an identifier (RB-ID) of a bearer to be set for the "Inter-site CA" in the radio base station eNB #11.

Alternatively, by using "HO command" included in the "confirmation," the radio base station eNB #11 may notify the identifier of the bearer to be set for the "Inter-site CA" in the radio base station eNB #11.

Here, instead of the existing "HO command," the "HO command" may include an identifier indicating as being "HO command" for performing the "Inter-site CA."

Note that such an identifier may be included in "Mobility Control Info."

Meanwhile, the radio base station eNB #11 may notify a random access channel (RACH) resource used for a random access (RA) procedure, by using the "confirmation."

Here, the radio base station eNB #11 may be notified of the channel resource for the random access procedure only at the time of setting an initial secondary cell.

Alternatively, the radio base station eNB #11 may notify the random access channel resource used for the random access procedure, by using the "HO command" included in the "confirmation."

Here, the random access channel resource includes "Preamble index," an RACH resource position, and the like.

Moreover, the radio base station eNB #11 may notify setting information on the radio base station eNB #11, by using the "confirmation."

Alternatively, the radio base station eNB #11 may notify the setting information on the radio base station eNB #11, by using the "HO command" included in the "confirmation."

Here, the setting information on the radio base station eNB #11 includes configuration information on the PDCP (Packet Data Convergence Protocol) layer, configuration information on the RLC (Radio Link Control) layer, configuration information on the MAC (Media Access Control) layer; configuration information on the physical layer; and the like.

In step S1003, the radio base station eNB #1 sends the mobile station UE "RRC connection reconfiguration" in response to the "confirmation."

Here, the "RRC connection reconfiguration" may include the above-described "configuration" or "HO command" as a whole, or include information elements set in the above-described "configuration" or "HO command."

At this time, scheduling of the bearer to be set in the radio base station eNB #11 may be suspended.

In step S1004, the radio base station eNB #1 performs "Data forward procedure" with the radio base station eNB #11.

Here, when the mobile station UE receives the "RRC connection reconfiguration," the mobile station UN performs the "random access procedure" with the radio base station eNB #11.

When the random access procedure is completed, in step S1005, the mobile station UE sends the radio base station eNB #11 "RRC connection reconfiguration complete."

In step S1006, the radio base station eNB #11 sends the core network device CN "Path switch request."

In step S1007, the core network device ON switches a downlink path addressed to the mobile station UE from a path through the radio base station eNB #1 to a path through the radio base station eNB #11, and sends the radio base station eNB #1 "End marker." In step S1008, the radio base station eNB #1 sends the radio base station eNB #11 the "End marker."

In step S1009, the core network device CN sends the radio base station eNB #11 "Path switch ACK."

In step S1010, the radio base station eNB #11 sends the radio base station eNB #1 "CA addition complete" which indicates completion of the procedure for starting the "Inter-site CA."

First Modified Example

Figure 3:
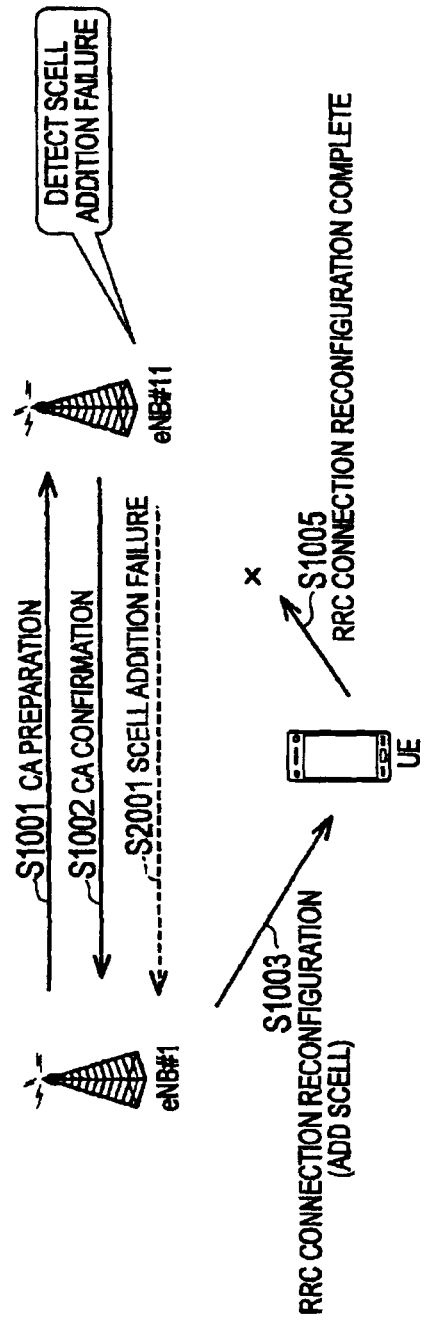
FIG. 3 is a sequence diagram for explaining an operation of a mobile communication system according to a first modified example of the present invention.
Figure 4:
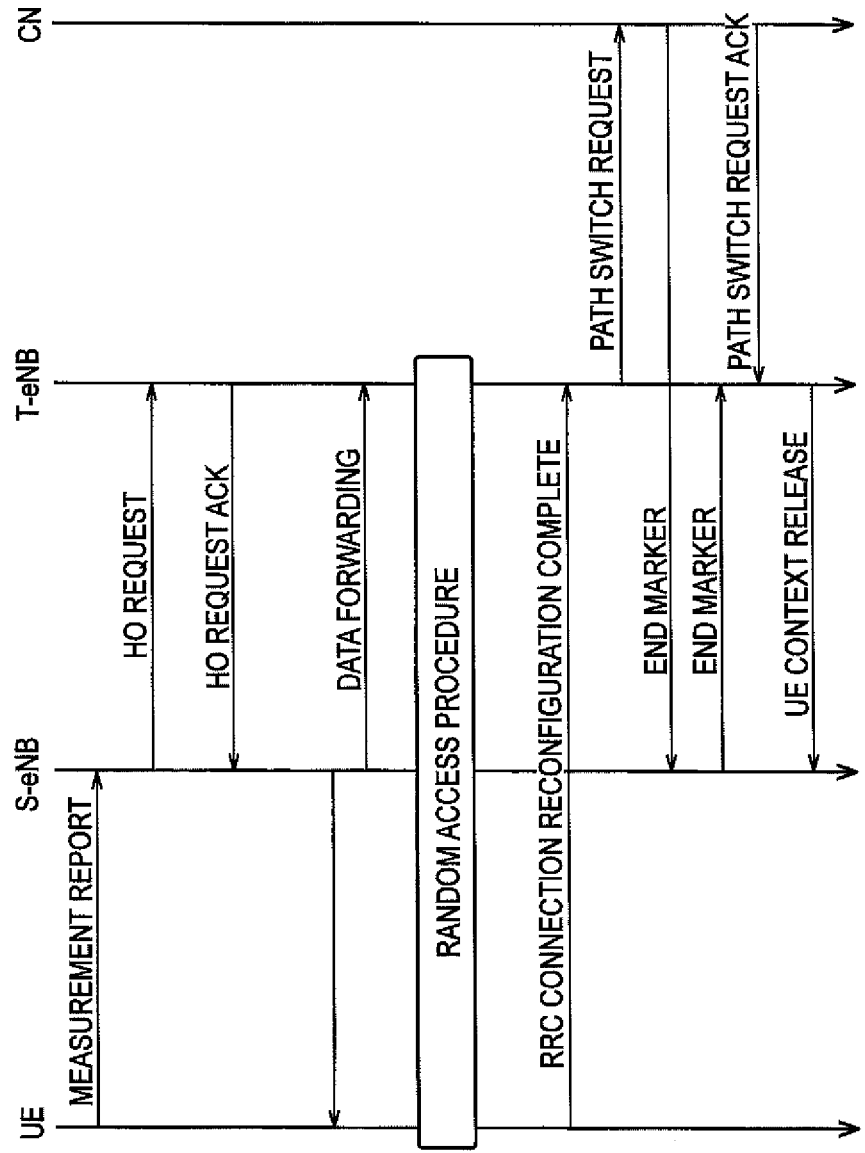
FIG. 4 is a diagram for explaining the related art.
Figure 5:
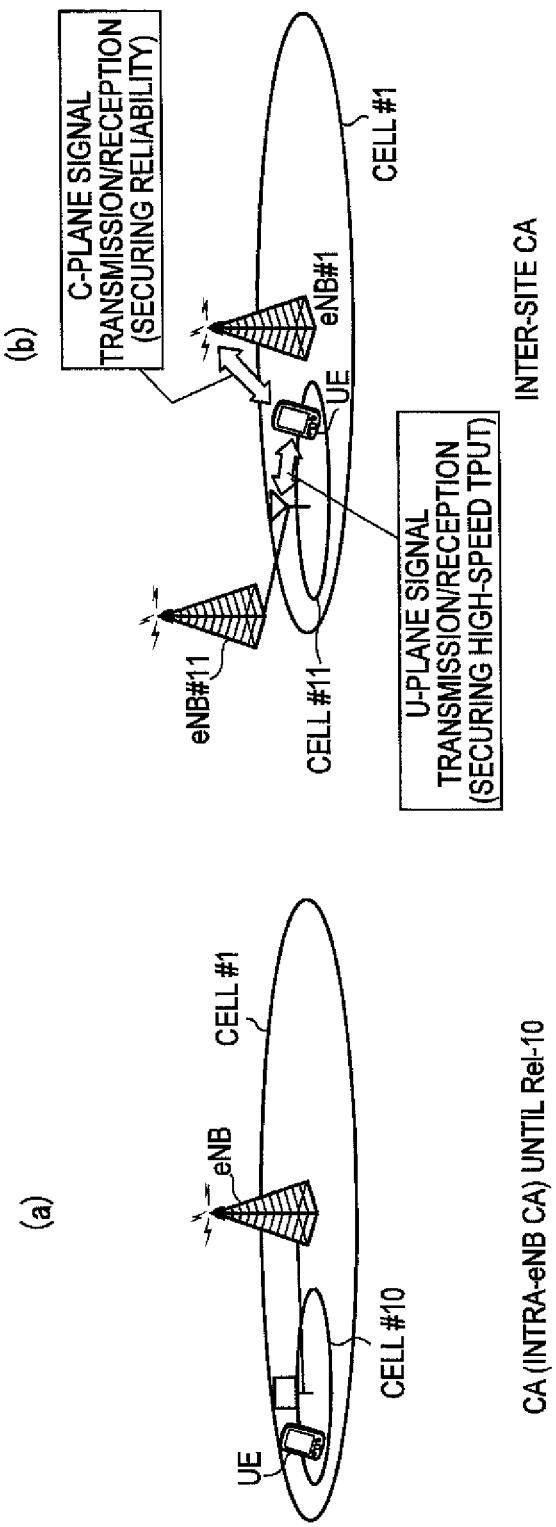
FIG. 5 is a diagram for explaining the related art.

With reference to FIG. 3, a mobile communication system according to a first modified example of the present invention will be described below while focusing on different features from those of the aforementioned mobile communication system according to the first embodiment.

In the mobile communication system according to the first modified example, as shown in FIG. 3, when the radio base station eNB #11 does not receive the "RRC connection reconfiguration complete" in step S1005 in FIG. 2 even after a lapse of a predetermined time period after sending the "confirmation" in step S1002 in FIG. 2, the radio base station eNB #11 is configured to send the radio base station eNB #1 a signal indicating the non-reception in step S2001.

In this case, the radio base station eNB #11 is configured to release the resource (such as a PUCCH (physical Uplink Control Channel) resource or an SRS (Sounding Reference Signal)) secured for the mobile station UE, and a context of the mobile station UE.

Meanwhile, the radio base station eNB #1 may be configured to cancel the procedure for starting the "Inter-site CA" when the above-mentioned signal is received.

In the meantime, the radio base station eNB #1 may be configured to notify the mobile station UE of cancellation of the procedure for starting the "Inter-site CA" when the above-mentioned signal is received.

Alternatively, the mobile station UE may be configured to autonomously cancel the procedure for starting the "Inter-site CA" without receiving the above-mentioned notification.

The features of the present embodiment may also be expressed as follows.

A first feature of the present embodiment is summarized as a mobile communication method including: a step A of causing a radio base station eNB#1 (first radio base station) to send a radio base station eNB#11 (second radio base station) "CA preparation (carrier aggregation preparation signal)" when the radio base station eNB#1 determines to start "Inter-site CA (carrier aggregation)" for a mobile station UE, where the carrier aggregation uses the radio base station eNB#1 and the radio base station eNB#11; a step B of causing the radio base station eNB#11 to send the radio base station eNB#1 "confirmation (confirmation signal)" in response to the "CA preparation;" a step C of causing the radio base station eNB#1 to send the mobile station UE "RRC connection reconfiguration (connection reconfiguration signal)" in response to the "confirmation;" a step D of causing the mobile station UE to perform a random access procedure with the radio base station eNB#11 in response to the "RRC connection reconfiguration;" a step E of causing the mobile station UE to send the radio base station eNB#11 "RRC connection reconfiguration complete (connection reconfiguration completion signal)" when the random access procedure is completed; a step F of causing the radio base station eNB#11 to send a core network device CN "Path switch request (path switch request signal);" a step G of causing the core network device CN to send the radio base station eNB#11 "Path switch ACK (path switch completion signal);" and a step H of causing the radio base station eNB#11 to send the radio base station eNB#1 "CA addition complete (carrier aggregation procedure completion signal)" indicating completion of a procedure for starting the "Inter-site CA."

According to the above-described features, utilization of the existing X2 handover procedure makes it possible to perform the procedure for starting the "Inter-site CA" without involving significant changes in the specification of the network.

In the first feature of the present embodiment, in the step A, the radio base station eNB#1 may notify of an identifier of a bearer to be set for the "Inter-site CA" in the radio base station eNB#11, by using the "CA preparation."

In the first feature of the present embodiment, in the step B, the radio base station eNB#11 may notify of an identifier of a bearer to be set for the "Inter-site CA" in the radio base station eNB#11, by using the "confirmation."

According to the above-described features, the radio base station eNB #11 can notify the radio base station eNB #1 of the information necessary for the procedure for starting the "Inter-site CA" (the identifier of the bearer) by using the newly defined "confirmation."

In the first feature of the present embodiment, in the step B, the radio base station eNB#11 may notify of a random access channel resource used for the random access procedure, by using the "confirmation."

According to the above-described feature, the radio base station eNB #11 can notify the radio base station eNB #1 of the information necessary for the procedure for starting the "Inter-site CA" (the random access channel resource) by using the newly defined "confirmation."

In the first feature of the present embodiment, in the step B, the radio base station eNB#11 may notify of setting information on the radio base station eNB#11, by using the "confirmation."

According to the above-described feature, the radio base station eNB #11 can notify the radio base station eNB #1 of the information necessary for the procedure for starting the "Inter-site CA" (the setting information on the radio base station eNB #11) by using the newly defined "confirmation."

In the first feature of the present embodiment, in the step B, the radio base station eNB#11 may include "HO command (handover command signal)" in the "confirmation," and notify of an identifier of a bearer to be set for the "Inter-site CA" in the radio base station eNB#11, by using the "HO command."

According to the above-described feature, the radio base station eNB #11 can notify the radio base station eNB #1 of the information necessary for the procedure for starting the "Inter-site CA" (the identifier of the bearer) by using the existing "HO command."

In the first feature of the present embodiment, in the step B, the radio base station eNB#11 may include "HO command" in the "confirmation," and notify of a random access channel resource used for the random access procedure, by using the "HO command."

According to the above-described feature, the radio base station eNB #11 can notify the radio base station eNB #1 of the information necessary for the procedure for starting the "Inter-site CA" (the random access channel resource) by using the existing "HO command."

In the first feature of the present embodiment, in the step B, the radio base station eNB#11 may include "HO command" in the "confirmation," and notify of setting information on the radio base station eNB#11 by using the "HO command."

According to the above-described feature, the radio base station eNB #11 can notify the radio base station eNB #1 of the information necessary for the procedure for starting the "Inter-site CA" (the setting information on the radio base station eNB #11) by using the existing "HO command."

In the first feature of the present embodiment, in the step B, the radio base station eNB#11 may include an identifier in the "HO command," the identifier indicating that the "HO command" is "HO command" for performing the "Inter-site CA."

According to the above-described feature, the radio base station eNB #1 can easily distinguish between the existing "HO command" and the "HO command" for performing the "Inter-site CA" by using the above-described identifier.

In the first feature of the present embodiment, if the radio base station eNB#11 does not receive the "RRC connection reconfiguration complete" even when a predetermined time period elapses after the sending of the "confirmation," the radio base station eNB#11 may send the radio base station eNB#1 a signal indicating the non-reception.

According to the above-described features, the radio base station eNB #1 can promptly recognize the procedure for starting the "inter-site CA" (a failure in a procedure for setting the Scell).

It should be noted that the foregoing operations of the mobile stations UE, the radio base stations eNB#1/eNB#11, and the core network device CN may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile stations UE, the radio base stations eNB#1/eNB#11, and the core network device CN. Otherwise, the storage medium and the processor may be provided as discrete components inside the mobile stations UE, the radio base stations eNB#1/eNB#11, and the core network device CN.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2013-062706 (filed on Mar. 25, 2013) is incorporated by reference in the present specification.

INDUSTRIAL APPLICABILITY

As described above, according to the present invention, it is possible to provide a mobile communication method which is capable of performing a procedure for starting the "Inter-site CA" while minimizing modification of an existing network configuration.

EXPLANATION OF THE REFERENCE NUMERALS eNB #1, eNB #11 radio base station
UE mobile station
CN core network device

The invention claimed is:

1. A mobile communication method comprising:
a step A of causing a first radio base station to send a second radio base station a carrier aggregation preparation signal when the first radio base station determines to start carrier aggregation for a mobile station, where the carrier aggregation uses the first radio base station and the second radio base station;
a step B of causing the second radio base station to send the first radio base station a confirmation signal in response to the carrier aggregation preparation signal;
a step C of causing the first radio base station to send the mobile station a connection reconfiguration signal in response to the confirmation signal;
a step D of causing the mobile station to perform a random access procedure with the second radio base station in response to the connection reconfiguration signal;
a step E of causing the mobile station to send the second radio base station a connection reconfiguration completion signal when the random access procedure is completed;
a step F of causing the second radio base station to send a core network device a path switch request signal;
a step G of causing the core network device to send the second radio base station a path switch completion signal; and
a step H of causing the second radio base station to send the first radio base station a carrier aggregation procedure completion signal indicating completion of a procedure for starting the carrier aggregation.

2. The mobile communication method according to claim 1, wherein, in the step A, the first radio base station notifies of an identifier of a bearer to be set for the carrier aggregation in the second radio base station, by using the carrier aggregation preparation signal.

3. The mobile communication method according to claim 1, wherein, in the step B, the second radio base station notifies of an identifier of a bearer to be set for the carrier aggregation in the second radio base station, by using the confirmation signal.

4. The mobile communication method according to claim 1, wherein, in the step B, the second radio base station notifies of a random access channel resource used for the random access procedure, by using the confirmation signal.

5. The mobile communication method according to claim 1, wherein, in the step B, the second radio base station notifies of setting information on the second radio base station, by using the confirmation signal.

6. The mobile communication method according to claim 1, wherein, in the step B, the second radio base station includes a handover command signal in the confirmation signal, and notifies of an identifier of a bearer to be set for the carrier aggregation in the second radio base station, by using the handover command signal.

7. The mobile communication method according to claim 1, wherein, in the step B, the second radio base station includes a handover command signal in the confirmation signal, and notifies of a random access channel resource used for the random access procedure, by using the handover command signal.

8. The mobile communication method according to claim 1, wherein, in the step B, the second radio base station includes a handover command signal in the confirmation signal, and notifies of setting information on the second radio base station by using the handover command signal.

9. The mobile communication method according to claim 6, wherein, in the step B, the second radio base station includes an identifier in the handover command signal, the identifier indicating that the handover command signal is a handover command signal for performing the carrier aggregation.

10. The mobile communication method according to claim 1, wherein, if the second radio base station does not receive the connection reconfiguration completion signal even when a predetermined time period elapses after the sending of the confirmation signal, the second radio base station sends the first radio base station a signal indicating the non-reception.

11. The mobile communication method according to claim 7, wherein, in the step B, the second radio base station includes an identifier in the handover command signal, the identifier indicating that the handover command signal is a handover command signal for performing the carrier aggregation.

12. The mobile communication method according to claim 8, wherein, in the step B, the second radio base station includes an identifier in the handover command signal, the identifier indicating that the handover command signal is a handover command signal for performing the carrier aggregation.

* * * * *